United States Patent [19]

Frassica

[11] Patent Number: 4,640,330

[45] Date of Patent: Feb. 3, 1987

[54] SEAL DEVICE FOR CENTRAL SECTIONS OF WHEEL HALVES

[76] Inventor: James J. Frassica, 5 Essex Pl., Chelmsford, Mass. 01824

[21] Appl. No.: 697,065

[22] Filed: Jan. 31, 1985

[51] Int. Cl.$^4$ ................................................ B60B 3/08
[52] U.S. Cl. ................................. 152/404; 301/63 DS; 152/DIG. 10; 285/363
[58] Field of Search ................ 403/288, 337; 285/363; 301/63 DS, 63 DD; 152/404, 413, DIG. 10, 405

[56] References Cited

U.S. PATENT DOCUMENTS

| | | | |
|---|---|---|---|
| 3,592,480 | 7/1971 | Koranyi | 285/363 X |
| 3,826,538 | 7/1974 | Lipper | 301/63 DS X |
| 4,123,112 | 10/1978 | Mills | 301/63 DS X |
| 4,223,952 | 9/1980 | Weld | 301/63 DS |
| 4,253,514 | 3/1981 | Imamura | 152/404 X |

FOREIGN PATENT DOCUMENTS 0006676  9/1980  European Pat. Off. ............ 152/404

Primary Examiner—David A. Scherbel
Attorney, Agent, or Firm—Michael J. Ram

[57] ABSTRACT

The present invention is a wheel for vehicles consisting of first and second generally cupshaped, substantially similiar wheel halves each having an integral center section and an integral rim section with a central opening in the center section and a sealing assembly sandwiched between the wheel halves consisting of an inner ring, an outer ring and an O-ring positioned between the two rings, the whole assembly being bolted together so that the O-ring creates a air-tight seal between the central sections of the wheel halves.

2 Claims, 4 Drawing Figures

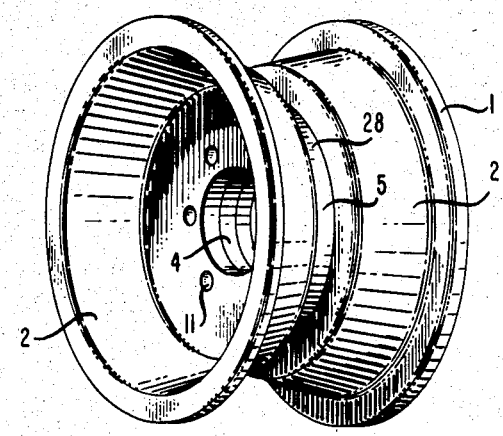
FIG. 1
FIG. 3
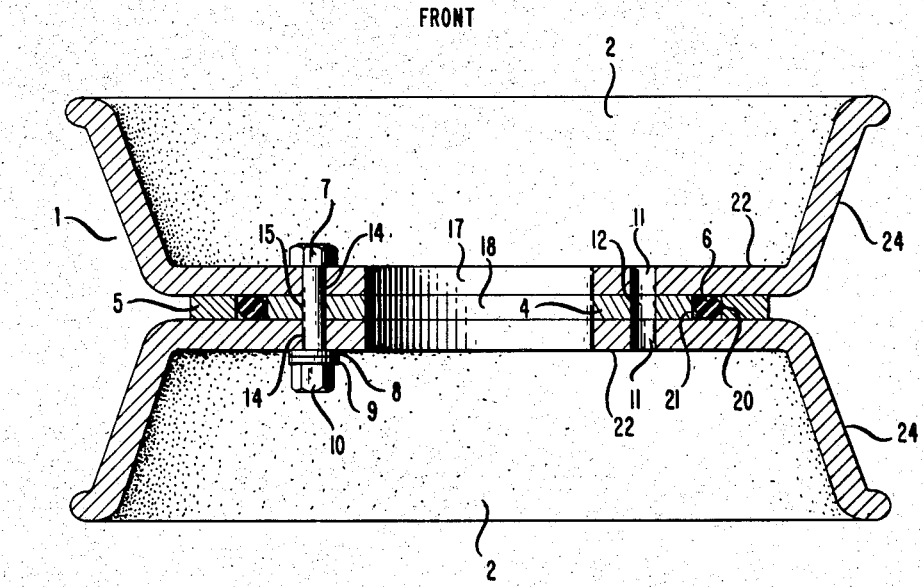

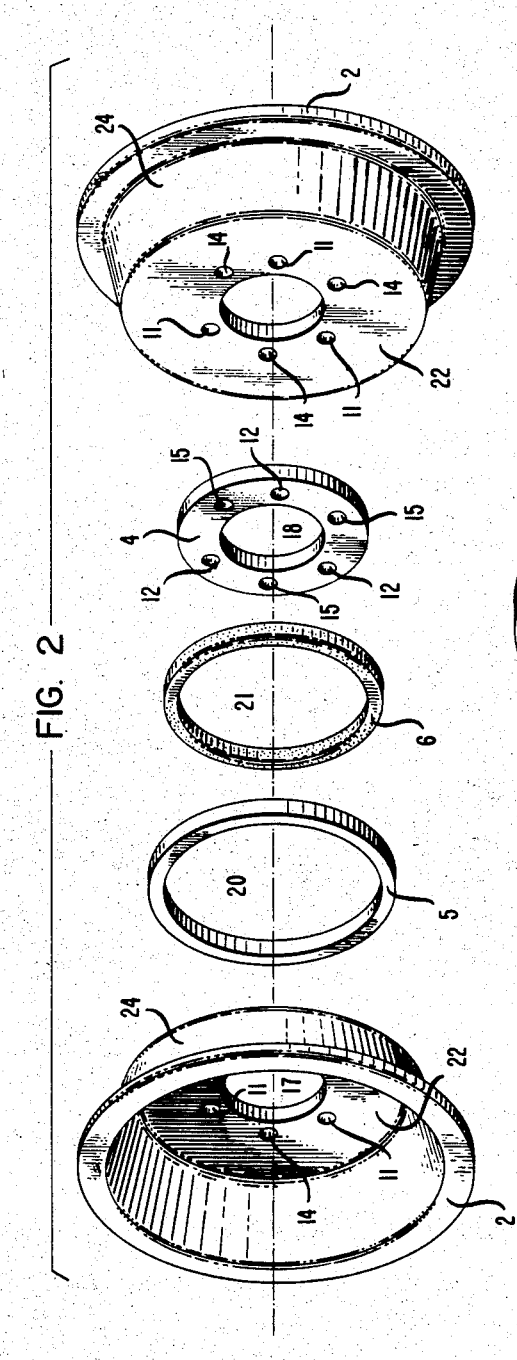
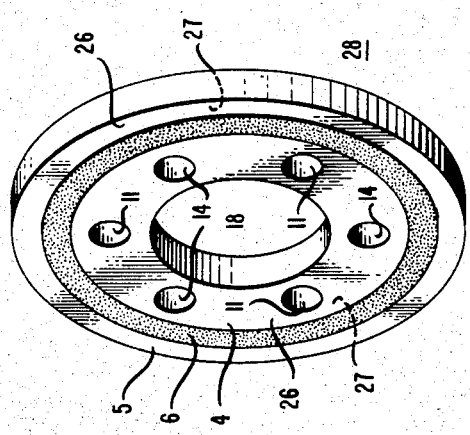
FIG. 2
FIG. 4

SEAL DEVICE FOR CENTRAL SECTIONS OF WHEEL HALVES

BACKGROUND OF THE INVENTION

The present invention relates to automotive wheels of a two piece construction and, in more particular, to wheels with tubeless tires used on Karts for racing or similiar activities. The unique structure and assembly of the wheel and tires allows easy assembly to a structure specifically designed to maintain inflation of the tire.

Wheels used on vehicles used in the sport of Go-Karting are commonly comprised of two rims bolted together. The tires applied to these rims may be either solid, or pneumatic tubed or tubeless tires. In recent years the trend has been toward greater use of tubeless tires.

When tubeless tires are used, means must be established to insure the assembly remains airtight. Such as assembly usually requires at least three seals The first seal is at the tire and rim interface. This seal is brought about by the cooperating design of the rim edge and the tire bead. The second seal, between the valve stem and the rim, is effected by an interference fit of the stem into a hole in the rim.

The third seal occurs between the two wheel halves. There are presently several methods to accomplish this seal but each of these methods has shortcomings. These methods include applying a film of RTV silicone material to the faces of the wheel parts which are then joined, applying a rubber gasket to the mating surfaces, combined use of rubber cement, bolts and an O-ring placed around the wheel halves at their outer intersection, or placing between the wheel halves a plate having a circular groove in each of its faces with an O-ring placed in each of the grooves.

Applying a seal of RTV silicone material or rubber cement between the wheel halves is messy, may not produce a consistent seal and must be allowed to dry before the tire is inflated. Also it must be removed after each use and then reapplied before each reuse. Use of a solid rubber gasket between the wheel halves may result in leaks at high pressure. Also shifting of the rim halves is a common problem. Use of a plate with gaskets or O-rings on each surface results in a wheel assembly much thicker and heavier than the present invention. This requires mounting a wider tire with a smaller circumference thus necessitating a new gearing arrangement. Wider wheel dimensions also reduces ground clearance thus increasing the possibility of equipment damage.

Several patents have addressed the problem of constructing an airtight wheel assembly. U.S. Pat. Nos. 3,826,538 and 4,223,952 disclose products which utilize a disc with grooves on the two surfaces thereof and an O-ring in each groove. In the '538 patent this disc, which also incorporates an integral cylindrical collar to act as a centering means, is used with two different, specially designed wheel halves. The wheel of U.S. Pat. No. 4,123,112 also requires a specially designed rim half with a groove in an inner surface for accommodating an O-ring. In U.S. Pat. No. 4,424,842 a rubber sealing ring is bonded directly to an inner surface of one of the wheel halves.

SUMMARY OF THE INVENTION

In accordance with the present invention a relatively inexpensive apparatus and method has been developed for the assembly of an airtight rim and inflated tire for use on vehicles, particularly for vehicles used in the sport of Go-Karting. The present assembly allows two similar wheel halves to be assembled with a tire easily, rapidly, and repetitively in the same reproducable manner without the need for extensive cleaning and preparation of the wheel mating surfaces or excesive cleanup procedures after use of the wheel.

Briefly, the wheel of the invention comprises first and second generally similiar cup-shaped wheel halves, each of the halves having a center section with a central opening therein, an integral rim section, a flat planer mating surface covering at least a portion of the area between the central hole and the rim section and a series of holes disposed concentrically around the central hole in the planer surface; and a sealing portion consisting of a an inside ring, an O-ring and an outer ring such that the outer ring is of a diameter no greater than the diameter of the mating surface, the inner ring has holes therein which correspond with the center hole and the concentrically disposed holes in the wheel, the outer diameter of the inner ring is slightly smaller than the inner diameter of the outer ring and the space between the inner ring and outer ring when placed coaxially is partially or fully filled by the O-ring. The wheel is assembled by placing the inflatable tire between the rims, sandwiching the sealing portion between the wheels and bolting the pieces together using some of the concentric holes. The remaining holes are used to mount the wheel onto the vehicle.

OBJECTS

It is therefore an object of the present invention to provide a decorative, high performance easily assembled wheel of light weight construction.

It is a further objective of the present invention to provide a two piece wheel construction having a novel construction for forming an air-tight seal between the halves.

Still other objects, features and advantages of the invention will become apparent to those skilled in the art from a reading of the following detailed description and drawings.

BRIEF DESCRIPTION OF THE DRAWINGS

FIG. 1 is a perspective view of the present wheel;

FIG. 2 is an exploded, perspective view of the wheel of FIG. 1;

FIG. 3 is a longitudinal sectional view of the wheel of FIG. 1 and FIG. 2 taken through the longitudinal axis thereof; and FIG. 4 is a perspective view of the sealing device of the wheel.

DESCRIPTION OF THE PREFERRED EMBODIMENT

Referring now to the drawings, there is shown a wheel assembly generally designated 1, and within this assembly is a seal device 28 constructed in accordane with the teachings of the present invention. Wheel 1 comprises first and second generally cup shaped wheel halves 2, both wheel halves being generally of the same shape and size. Both wheel halves 2 have a center section 22 and integral rim section 24. Centrally located in the center section 22 is a central opening 17 which corresponds with the axle of the vehicle upon which the assembly 1 is placed. Each wheel half is preferably made in one piece from a light weight material such as aluminum. Furthermore, because of the cup-shaped appearance, each of the halves 2 may be drawn in a punch press or metal spun in accordance with known manufacturing procedures. Both wheel sections 2, when taken together, have the appearance of a conventional wheel rim. While the invention preferably utilizes identical or similiar wheel halves, it is well recognized in the art that they may each have a different shape as long as they are of the same diameter and have compatible mating surfaces.

The wheel 1 further comprises a seal device, generally designated 28, having surfaces 26 and 27 substantially planar and parallel to center sections 22 of the wheel halves 2. Seal device 28 includes an O-ring 6 restrained circumferentially by an outside ring 5 and an inside ring 4 Within inside ring 4 is a central opening 18 approximately equal in diameter to central openings 17 in both wheel halves 2. The cross sectional diameter of O-ring 6 is greater than the thickness of outside ring 5 and inside ring 4 both of which are of substantially the same thickness. The inside radius of the outside ring 5 and the outside radius of the inside ring differ by an amount equal to or slightly larger than the cross-sectional diameter of O-ring 6. Therefore when the assembled sealing device is sandwiched between center sections 22 of the wheel halves 2 compressive forces exerted on the O-ring by the asembling means effects an air tight seal.

Both the wheel central sections 22 and the inner ring 4 have a series of holes placed around the central opening, preferably in a coaxial arrangement, such that the holes in each of the three parts are placed one over another. It is preferred that there be an even number of holes and that every second hole 14, 15 be used for assembling the wheel and the alternate holes 11, 12 be used for mounting the assembled wheel onto the vehicle. The preferred means for assembling the wheel halves 2 with the sealing device 28 are bolts 7 in conjunction with flat washer 8, lock washer 9 and hex nut 10 with the bolts placed through holes 14, 15 but any assembly means which suitably compresses the O-ring 6 may be utilized.

The preferred method of assembling the wheel assembly 1 is as follows:

1. One of the wheel halves 2 is placed in a horizontal position,

2. The inner ring 4, outside ring 5 and O-ring 6 are nested together in the manner shown in FIG. 4 and placed on top of the center section 22 of the wheel half 2 such that the central openings 17, 18, mounting holes 11, 12 and assembly holes 14, 15 are all aligned, 3. A tire is placed on the wheel half 2 such that the tire bead coincides around its full periphery with the wheel rim section 24, 4. The second wheel half 2 is placed on top of the above assembly with holes 11, 14 and opening 17 matching the previously positioned holes 11, 12, 14, 15 and openings 17, 18, 5. Bolts 7 are placed through assembly holes 14, 15, washers 8, 9 and hex nut 10 are placed on each bolt and the nuts are rotated until each bolt and nut assembly is tightened to about the same tension and the O-ring 6 is uniformly compressed.

While the above method of assembly is preferred variations which result in the same final structure are considered to be within the scope of the invention. For example, the wheel may be assembled vertically using the vehicle axle or other suitable structure placed in the central opening 17, 18 to support the wheel during assembly. The O-ring 6 forms an air tight seal between the wheel halves 2 thus preventing leakage of air from an inflated tire mounted on the wheel assembly 1. Utilizing the mounting holes 11, 12 the inflated tire and wheel assembly can now be mounted on a vehicle in a conventional manner through the use of threaded studs on the ends of the vehicle axles.

It can therefore be seen that, in accordance with the present invention, the more complex, expensive and bulky procedures inherent in prior art devices and techniques for assembling such wheel have been solved by providing the novel seal device 28 and complementary wheel halves 2 of the invention. The present invention also eliminates the need to smear rubber and plastic compounds or the use of elastomeric gaskets between wheel halves to effect an airtight seal. Seal 28 also eliminates the need for the wider, more complex and expensive devices utilizing double O-ring seals with O-ring grooves. Seal device 28 utilizes a novel assembly of an O-ring gasket 6 captured by an inside ring 4 and outside ring 5 for the purposes of positioning and controlling the deformation of the O-ring 6. Seal 28 also has a thin cross section, is light weight and inexpensive and has performance characteristics equal or better than prior art sealing methods. While the invention has been described with respect to a preferred physical embodiment constructed therewith, it will be apparent to those skilled in the art that various modifications may be made to the invention without departing from the scope and spirit of the invention. Accordingly, it is to be understood that the invention is not limited by the specific illustrative embodiment.

I claim:

1. A wheel comprising:

first and second generally cup shaped wheel halves having a center section, an integral rim section, and a central opening in said center section, said wheel halves being disposed with their central sections facing each other and parallel throughout their entire length, means forming an air-tight seal between the wheel halves center sections such that the sealing means is sandwiched between the center sections and in contact with the surfaces of both center sections wherein said means comprises an inner ring, an outer ring coaxially disposed about said inner ring, the outer diameter of the inner ring being smaller than the inner diameter of the outer ring and an O-ring positioned in the space between the inner and outer rings, both said inner and outer rings being separate from the wheel halves, and means for connecting the wheel halves together and compressing the O-ring.

2. The wheel of claim 1 wherein the inner and outer rings are of substantially the same thickness.

* * * * *